(12) United States Patent
Zhang et al.

(10) Patent No.: US 11,584,840 B1
(45) Date of Patent: Feb. 21, 2023

(54) LONG TERM STABLE BORON NITRIDE NANOTUBE AQUEOUS DISPERSIONS

(71) Applicants: Cheng Zhang, Miami, FL (US); Arvind Agarwal, Miami, FL (US); Xiaolong Lu, Miami, FL (US)

(72) Inventors: Cheng Zhang, Miami, FL (US); Arvind Agarwal, Miami, FL (US); Xiaolong Lu, Miami, FL (US)

(73) Assignee: THE FLORIDA INTERNATIONAL UNIVERSITY BOARD OF TRUSTEES, Miami, FL (US)

(*) Notice: Subject to any disclaimer, the term of this patent is extended or adjusted under 35 U.S.C. 154(b) by 0 days.

(21) Appl. No.: 17/538,653

(22) Filed: Nov. 30, 2021

(51) Int. Cl.
| | |
|---|---|
| C08K 3/38 | (2006.01) |
| C08K 7/00 | (2006.01) |
| C09K 5/10 | (2006.01) |
| C08K 7/04 | (2006.01) |
| C08K 7/02 | (2006.01) |
| C09K 5/08 | (2006.01) |
| C08K 13/02 | (2006.01) |
| B01F 23/50 | (2022.01) |

(52) U.S. Cl.
CPC ............. *C08K 3/38* (2013.01); *C08K 7/00* (2013.01); *C08K 7/02* (2013.01); *C08K 7/04* (2013.01); *C08K 13/02* (2013.01); *C09K 5/08* (2013.01); *C09K 5/10* (2013.01); *B01F 23/55* (2022.01); *C08K 2003/382* (2013.01); *C08K 2003/385* (2013.01); *C08K 2201/001* (2013.01); *C08K 2201/011* (2013.01)

(58) Field of Classification Search
CPC ... C09K 5/10; C09K 5/00; C09K 5/08; C08K 7/00; C08K 7/02; C08K 7/04; C08K 3/38; C08K 2003/382; C08K 2003/385; C08K 13/02; C08K 2201/001; C08K 2201/011; B01F 23/55; B01F 23/551
See application file for complete search history.

(56) References Cited

U.S. PATENT DOCUMENTS

| | | | |
|---|---|---|---|
| 2004/0040834 A1* | 3/2004 | Smalley | B82Y 15/00 204/164 |
| 2019/0039958 A1* | 2/2019 | Shahsavari | C04B 35/6229 |
| 2021/0062061 A1* | 3/2021 | Peterson | C09K 5/10 |
| 2021/0162456 A1* | 6/2021 | Ao | C01B 21/064 |

(Continued)

OTHER PUBLICATIONS

Lu et al. "Hydroxylated boron nitride nanotube-reinforced polyvinyl alcohol nanocomposite films with simultaneous improvement of mechanical and thermal properties" Polymer Composites, 2020, 41, p. 5182-5192. Published online Aug. 27, 2020. (Year: 2020).*

(Continued)

*Primary Examiner* — Jane L Stanley
(74) *Attorney, Agent, or Firm* — Saliwanchik, Lloyd & Eisenschenk

(57) ABSTRACT

Boron nitride nanotube (BNNT) dispersions and methods of fabricating the same are provided. Tip sonication-assisted hydrolysis can be utilized, with a dispersant/surfactant (e.g., polyvinyl alcohol (PVA)). The fabrication process can be used to obtain large scale BNNT dispersions with long term stability (e.g., stability for at least 3 months, at least 4 months, at least 5 months, at least 6 months, or about 6 months).

12 Claims, 15 Drawing Sheets

(56) References Cited

U.S. PATENT DOCUMENTS

2021/0275412 A1\* 9/2021 Ao .................. A61K 8/064

OTHER PUBLICATIONS

Khoury et al. "Boron nitride nanotubes enhance mechanical properties of fibers from nanotube/polyvinyl alcohol dispersions", Nanoscale Advances, 2022, 4, p. 77-86. Published online Oct. 29, 2021. (Year: 2021).\*

Smith McWilliams et al. "Surfactant-assisted individualization and dispersion of boron nitride nanotubes", Nanoscale Advances, 2019, 1, p. 1096-1103. Published online Dec. 17, 2018. (Year: 2018).\*

Chang et al. "Electrostabilized homogeneous dispersion of boron nitride nanotubes in wide-range of solvents achieved by surface polarity modulation through pyridine attachment", Nano Research, 13(2), 2020, p. 344-352. Published online Jan. 7, 2020. (Year: 2020).\*

Nasrabadi et al. "Interactions between polymers and single-walled boron nitride nanotubes: a molecular dynamics simulation approach", J. Phys. Chem. B, 2010, 114, 15429-15436. Published online Nov. 9, 2010 (Year: 2010).\*

Gao et al. "noncovalent functionalization of boron nitride nanotubes using water-soluble synthetic polymers and the subsequent preparation of superhydrophobic surfaces", Polymer Journal, 2013, 45, 567-570. Published online Sep. 26, 2012 (Year: 2012).\*

Zhi et al. "purification of boron nitride nanotubes through polymer wrapping", J. Phys. Chem. B, 2006, 110, 4, 1525-1528. Published online Jan. 11, 2006 (Year: 2006).\*

Zhi et al. "perfectly dissolved boron nitride nanotubes due to polymer wrapping", JACS, 2005, 127, 46, 15996-15997. Published online Nov. 1, 2005 (Year: 2005).\*

O'Connell et al. "reversible water-solubilization of single-walled carbon nanotubes by polymer wrapping", Chemical Physics Letters, 342, 2001, 265-271. Published online Jul. 13, 2001 (Year: 2001).\*

Smith McWilliams et al. "dispersion and individualization of boron nitride nanotubes", Journal of Materials Research, 2022. Published Sep. 19, 2022 (Year: 2022).\*

\* cited by examiner

| Sample | Pure PVA | OH-BNNT/PVA |
|---|---|---|
| Thermal Conductivity (W/mK) | 0.28±0.02 | 0.35±0.02 |
| Thermal Diffusivity (mm$^2$/s) | 0.14±0.01 | 0.18±0.01 |
| Specific Heat Capacity (J/gK) | 1.53±0.07 | 1.46±0.09 |

LONG TERM STABLE BORON NITRIDE NANOTUBE AQUEOUS DISPERSIONS

BACKGROUND

Boron nitride nanotubes (BNNTs) are tubular structural analogues of carbon nanotubes and have high thermal conductivity and excellent mechanical characteristics, chemical stability, oxidation resistance, piezoelectric response, and electrical insulating ability. These characteristics make BNNTs attractive candidates for a variety of applications including thermal and mechanical reinforcements for composites, nanoscale electrical devices, protective shields, and biomedical applications in hazardous environments.

BRIEF SUMMARY

Embodiments of the subject invention provide novel and advantageous boron nitride nanotube (BNNT) dispersions and methods of fabricating the same. Tip sonication-assisted hydrolysis can be utilized, with a dispersant/surfactant (e.g., polyvinyl alcohol (PVA)). The fabrication process is inexpensive, facile, repeatable, environmentally friendly, and can be easily used to obtain large scale BNNT dispersions with long term stability (e.g., stability for at least 3 months, at least 4 months, at least 5 months, at least 6 months, or about 6 months). The dispersion can be homogenous and can be reinstated by simply shaking it (e.g., by hand for a short time (e.g., for 30 seconds or about 30 seconds). The BNNT dispersions can be aqueous dispersions (e.g., in water with no additives). Because no additional organic impurities can be present in the BNNT dispersions, the readily available pure BNNT aqueous dispersions can be directly used in composites or device manufacturing without further purification. This shortens the preparation time, decreases the residual contamination, reduces processing difficulties, and eliminates chemical compatibilities.

In an embodiment, a method of preparing a BNNT dispersion can comprise: providing BNNTs to a container comprising a solvent; and performing a tip sonication process on the container with the solvent and the BNNTs to disperse the BNNTs in the solvent, thereby preparing the BNNT dispersion. The method can further comprise dissolving a surfactant in the solvent before performing the tip sonication process, the surfactant being a non-toxic, non-hazardous surfactant. The surfactant can be, for example, PVA. The solvent can be a non-organic solvent (e.g., water, such as deionized water). The BNNT dispersion can have 100% stability (no agglomeration of BNNTs) for a long period of time (e.g., at least 30 days, at least 60 days, at least 75 days, or more). The BNNT dispersion can be such that, if agglomeration of BNNTs occurs in the container, the agglomeration can be dispersed by shaking the container with the BNNT dispersion by hand.

In another embodiment, a BNNT dispersion can comprise BNNTs dispersed in a solvent, the BNNT dispersion having 100% stability for a long period of time (e.g., at least 30 days, at least 60 days, at least 75 days, or more). The solvent can be a non-organic solvent (e.g., water, such as deionized water). The BNNT dispersion can further comprise a surfactant, the surfactant being a non-toxic, non-hazardous surfactant. The surfactant can be, for example, PVA.

DETAILED DESCRIPTION

Figure 1:
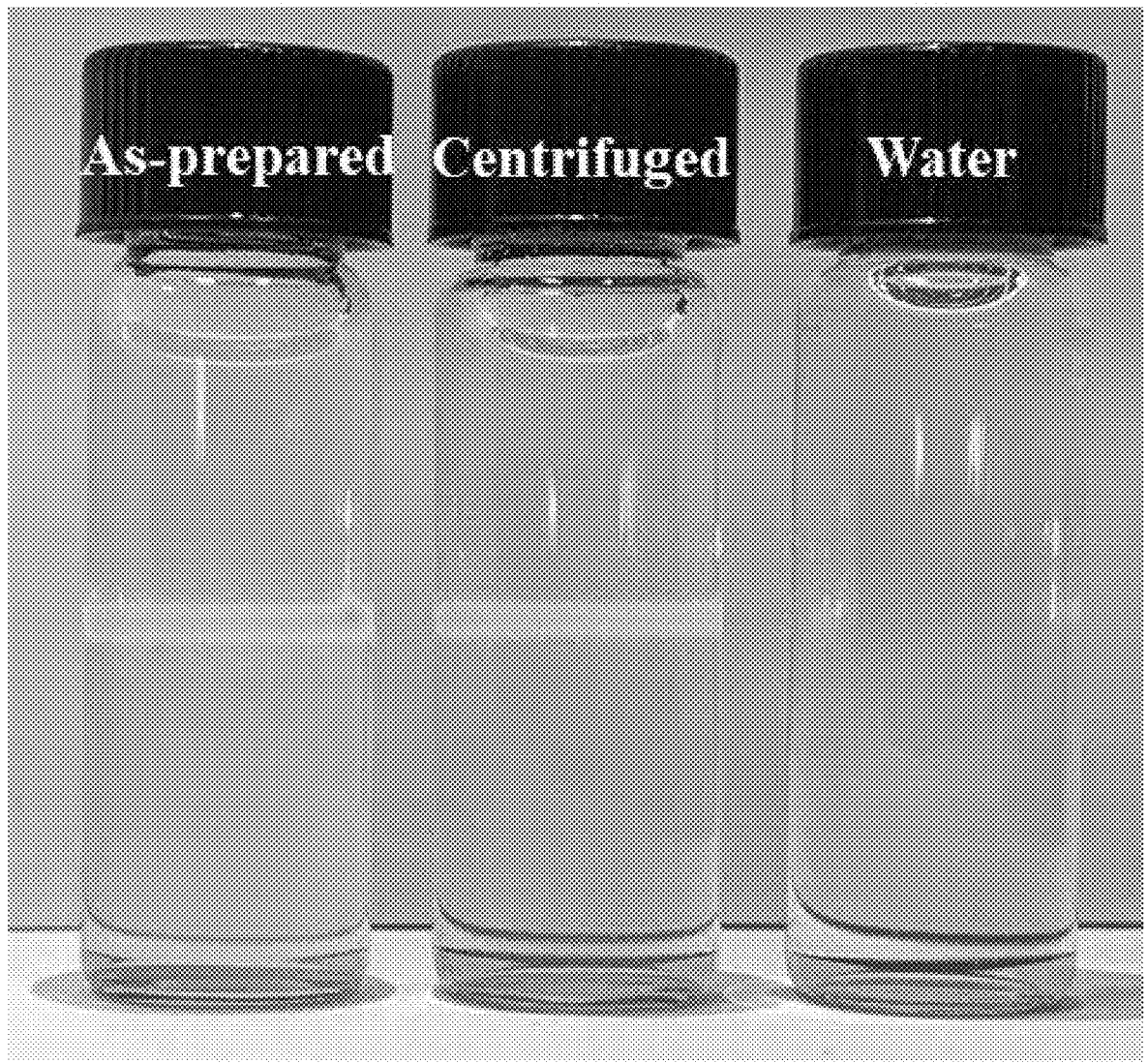
FIG. 1 shows an image of boron nitride nanotubes (BNNTs) dispersed in water to obtain a 0.1 milligram per milliliter (mg/ml) BNNT aqueous dispersion by a tip sonication process, according to an embodiment of the subject invention. The left-most container shows the aqueous dispersion as prepared (before centrifuging); the middle container shows the aqueous dispersion after centrifuging; and the right-most container shows water. A laser beam was passed through the as prepared dispersion and centrifuged dispersion (centrifuged at 2000 revolutions per minute (rpm) for 30 minutes (min)), leaving a visible track as a result of light scattering. The Tyndall effects indicate that BNNT aqueous dispersions have a good dispersion stability.

Embodiments of the subject invention provide novel and advantageous boron nitride nanotube (BNNT) dispersions and methods of fabricating the same. Tip sonication-assisted hydrolysis can be utilized, with a dispersant/surfactant (e.g., polyvinyl alcohol (PVA)). The fabrication process is inexpensive, facile, repeatable, environmentally friendly, and can be easily used to obtain large scale BNNT dispersions with long term stability (e.g., stability for at least 3 months, at least 4 months, at least 5 months, at least 6 months, or about 6 months). The dispersion can be homogenous and can be reinstated by simply shaking it (e.g., by hand for a short time (e.g., for 30 seconds or about 30 seconds). The BNNT dispersions can be aqueous dispersions (e.g., in water with no additives). Because no additional organic impurities can be present in the BNNT dispersions, the readily available pure BNNT aqueous dispersions can be directly used in composites or device manufacturing without further purification. This shortens the preparation time, decreases the residual contamination, reduces processing difficulties, and eliminates chemical compatibilities.

A central difficulty in working with BNNTs and incorporating BNNTs into composite materials and devices is preparing BNNT dispersions that are stable. BNNTs tend to easily entangle, bundle, and aggregate to form agglomerates, and separate from dispersions owing to their high aspect ratio and strong van der Walls interaction. This limits the storage applications and other applications for BNNTs. Embodiments of the subject invention address this problem by providing BNNT dispersions with long term stability, leading to applicability in industrial applications that can benefit from inexpensive, facile, repeatable, and environmentally friendly methods of preparing BNNT dispersions with long term stability.

BNNT dispersions of embodiments of the subject invention can display 100% stability (e.g., no agglomeration of BNNTs) for a period of time of, for example, any of the following values, about any of the following values, or at least any of the following values (all values are in days): 10, 20, 30, 40, 50, 55, 60, 65, 70, 75, 76, 80, 85, 90, 95, 100, 110, 120, or 121. For example, BNNT dispersions of embodiments of the subject invention can display 100% stability for at least 76 days. BNNT dispersions of embodiments of the subject invention can display significant stability (e.g., 25% or less agglomeration of BNNTs) for a period of time of, for example, any of the following values, about any of the following values, or at least any of the following values (all values are in days): 60, 65, 70, 75, 76, 80, 85, 90, 95, 100, 110, 120, 121, 122, 125, or 130. For example, BNNT dispersions of embodiments of the subject invention can display significant stability (e.g., 25% or less agglomeration of BNNTs) for a period of time of at least 122 days. Even once agglomeration begins, simple shaking by hand (e.g., for a period of time of less than a minute (e.g., 30 seconds or about 30 seconds)) can restore the dispersion to little to no agglomeration.

Dispersing techniques to obtain BNNT dispersions typically utilize organic solvents, surfactants, and functionalization. However, organic solvents (e.g., N,N-dimethyformamide (DMF), and N-methyl-2-pyrrolidone (NMP)) and surfactants (e.g., cetyltrimethylammonium bromide (CTAB) and sodium dodecyl benzenesulfonate (SDBS)) for dispersing BNNTs are toxic and hazardous. Functionalization on BNNTs is relatively challenging due to the chemical inertness of BNNTs and only lab-scale BNNT dispersions can be obtained in related art methods.

In contrast, embodiments of the subject invention can prepare BNNT dispersions with no organic solvents and no hazardous surfactants/dispersants used. Because the liquid medium or solvent for preparing the BNNT dispersions is water (e.g., deionized (DI) water) and the surfactant or dispersant can be non-hazardous (e.g., PVA), the methods of embodiments of the subject invention provide inexpensive, non-toxic, environmental-friendly ways to prepare BNNT dispersions. The sonication process is controllable, facile, and can also be easily scaled up from laboratory scale to industry scale. Further, BNNT aqueous dispersions of embodiments of the subject invention can be stored long-term with excellent dispersibility and directly used in several applications, which shortens the preparation time, reduces processing difficulties, and eliminates chemical compatibility issues.

In many embodiments of the subject invention, sonication can be used to disperse BNNTs in a solvent (e.g., water such as DI water) to obtain BNNT aqueous dispersions. Tip sonication can be used, and the tip diameter, amplitude, time, and deliver energy from the tip probe can be controllable to obtain repeatable and scalable results. A non-toxic, non-hazardous dispersant/surfactant can be used and dissolved in the solvent. For example, PVA can be the dispersant/surfactant. PVA is a hydroxyl-rich, non-toxic, biocompatible, water-soluble, colorless, and odorless polymer.

Figure 15:
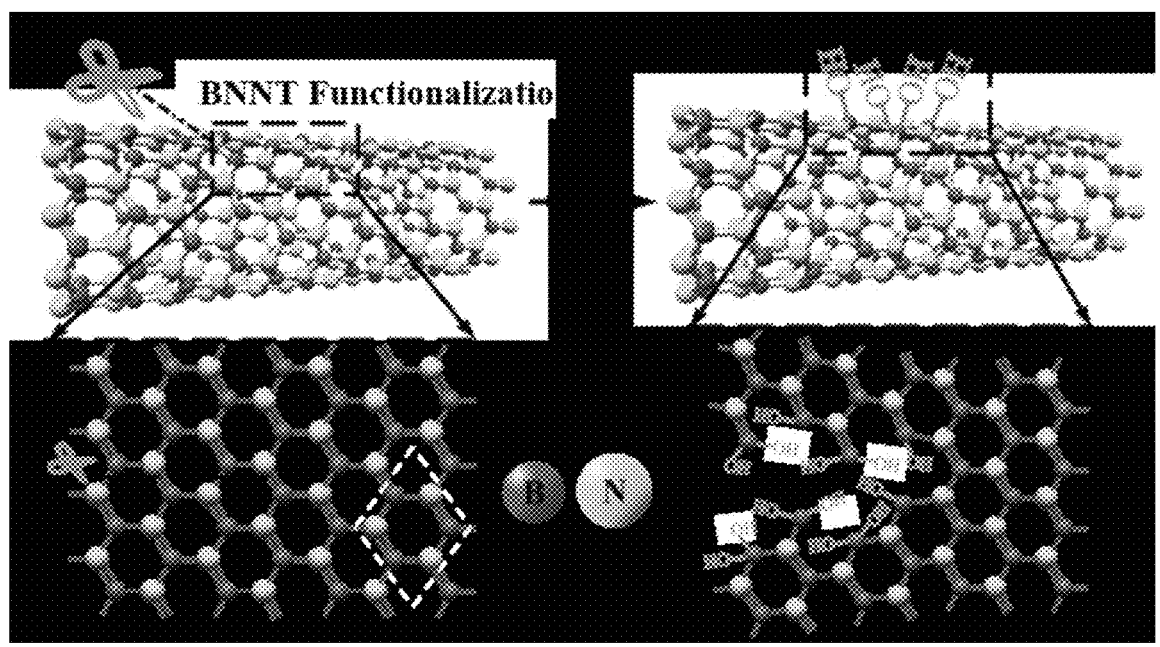
FIG. 15 shows a schematic of a functional process that could act as a "scissor" to break boron-nitrogen bonds and induce hydroxyl groups.

FIG. 15 shows that the high input energy from the tip probe during the tip sonication process could act as a "scissor" to break the boron-nitrogen bonds and introduce the defect sites, which can lead to the occurrence of hydrolysis. The hydroxyl groups on BNNT owing to the tip sonication process and the addition of PVA as a surfactant dissolved in water can contribute to preparing a high concentration of stable BNNT aqueous dispersions.

BNNT aqueous dispersions of embodiments of the subject invention can be stored for a long period of time (e.g., 1, 2, 3, 4, 5, 6, 7, 8, 9, 10, 11, or 12 months) and directly used in industrial applications such as radiation shielding, armor, coatings, batteries, piezoelectric composite fibers, aerospace applications, biomedical applications. BNNT aqueous dispersions of embodiments of the subject invention can also be used for printing technology, such as cast, screen, or inkjet printing, in which the solution is dried and removed and the desired shape is obtained. Embodiments of the subject invention provide methods of preparing BNNT aqueous dispersions that shorten preparation time, reduce processing difficulties, and eliminate or minimize chemical compatibility issues.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

MATERIALS AND METHODS

The tip for the tip sonication was VCX750 (SONICS & MATERIALS, INC., USA) with a tip diameter of 19 millimeters (mm), an amplitude of 75%, a sonication time of 45 minutes (min), and a delivered energy from the tip probe of 263 kilojoules (kJ).

EXAMPLE 1

BNNTs were dispersed in water to obtain a 0.1 milligram per milliliter (mg/ml) BNNT aqueous dispersion by a tip sonication process. Centrifugation (2000 revolutions per minute (rpm) for 30 min or about 30 min) was utilized to observe the stability of the BNNT aqueous dispersions. Tyndall effects indicated that 0.1 mg/ml BNNT aqueous dispersions without PVA had good dispersion stability (see FIG. 1).

EXAMPLE 2

Figure 2:
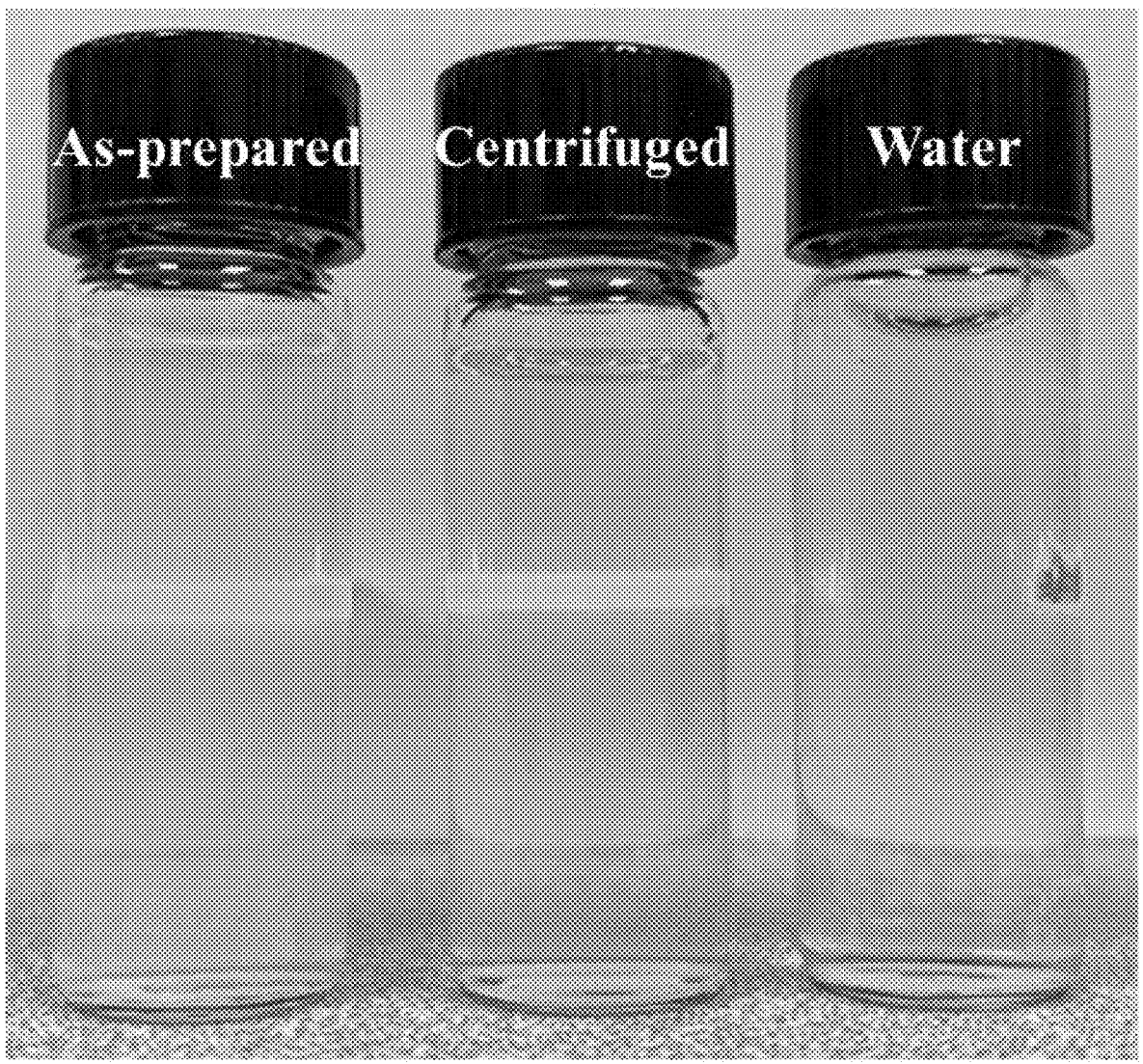
FIG. 2 shows an image of BNNTs dispersed in water, where polyvinyl alcohol (PVA) was used as a surfactant and also dissolved in the water, to obtain a 0.2 (mg/ml BNNT aqueous dispersion by a tip sonication process, according to an embodiment of the subject invention. The left-most container shows the aqueous dispersion as prepared (before centrifuging); the middle container shows the aqueous dispersion after centrifuging; and the right-most container shows water. The ratio of PVA:BNNT was 1:1. A laser beam was passed through the as prepared dispersion and centrifuged dispersion (centrifuged at 2000 rpm for 3 min), leaving a visible track as a result of light scattering. The Tyndall effects indicate that the high concentration of BNNT aqueous dispersions have a good dispersion stability.
Figure 3:
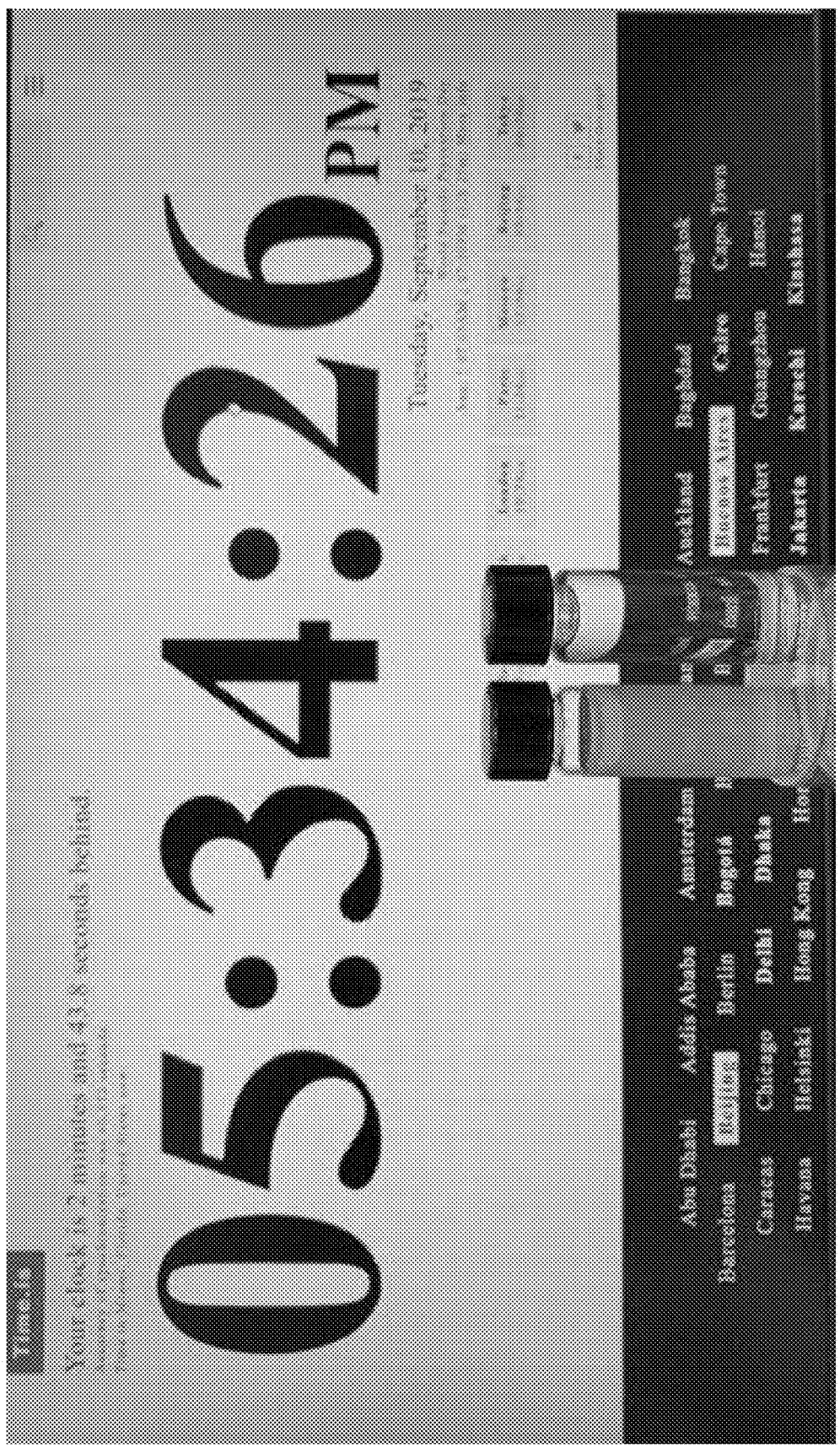
FIG. 3 shows an image of a 0.2 mg/ml BNNT aqueous dispersion with PVA (left container) prepared by a method according to the subject invention, and water (right container), showing the results of a sedimentation test to assess the stability.
Figure 4:
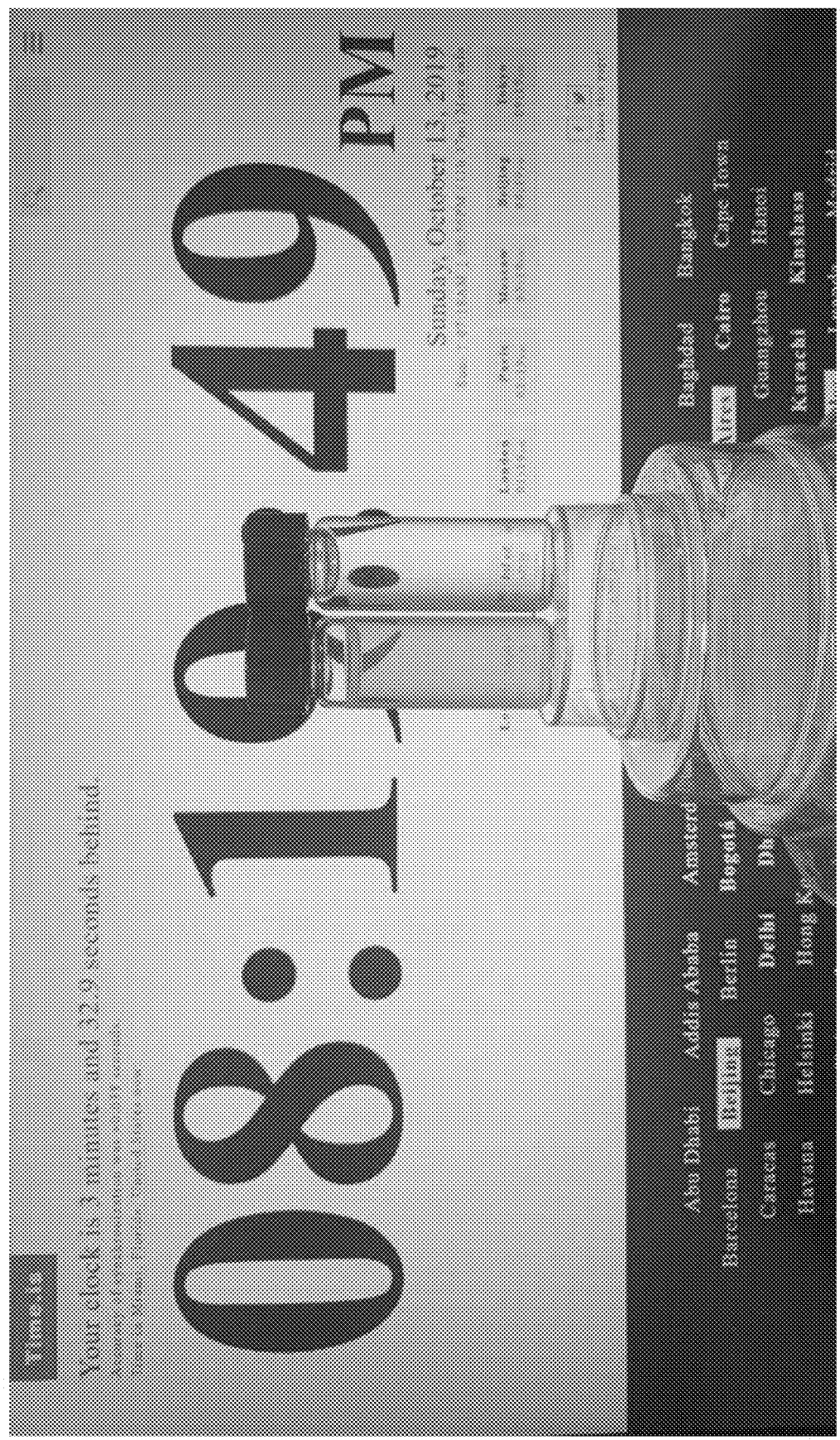
FIG. 4 shows an image of the 0.2 mg/ml BNNT aqueous dispersion with PVA (left container) and water (right container) from FIG. 3, after 33 days.
Figure 5:
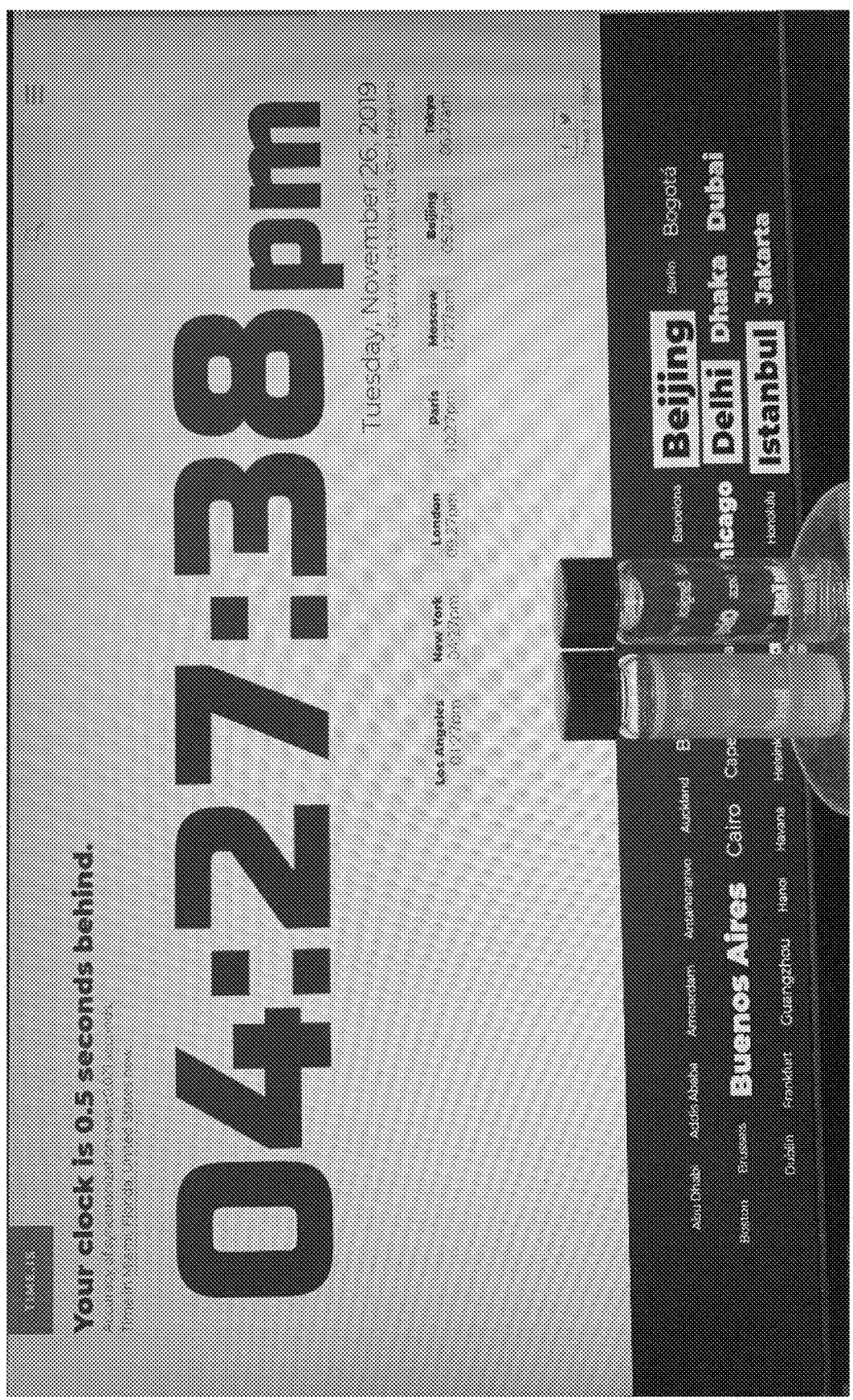
FIG. 5 shows an image of the 0.2 mg/ml BNNT aqueous dispersion with PVA (left container) and water (right container) from FIG. 3, after 76 days. No agglomeration was found in the dispersion, demonstrating that the BNNT aqueous dispersion has excellent stability (e.g., up to 100%) even after more than 75 days.
Figure 6:
FIG. 6 shows an image of the 0.2 mg/ml BNNT aqueous dispersion with PVA (left container) and water (right container) from FIG. 3, after 122 days. Some atrial agglomeration can be seen settled in the left container, showing that there was less than 100% stability by the 122-day mark but still has a high level of stability after 122 days.

PVA was dissolved in water as a surfactant, and then BNNTs were dispersed in water to obtain a 0.2 mg/ml BNNT aqueous dispersion by a tip sonication process. The ratio of PVA:BNNT was 1:1. The higher concentration BNNT aqueous dispersion (0.2 mg/ml) also showed good dispersion stability (see FIG. 2).

Figure 7:
FIG. 7 shows an image of the 0.2 mg/ml BNNT aqueous dispersion with PVA from FIG. 3, after about 11 months. BNNT agglomeration can be seen in the dispersions, and the supernatant was almost clear.
Figure 8:
FIG. 8 shows an image of the 0.2 mg/ml BNNT aqueous dispersion with PVA from FIG. 3, after about 11 months (same day as FIG. 7). BNNT agglomeration can be seen in the dispersions, and the supernatant was almost clear.
Figure 9:
FIG. 9 shows an image of the 0.2 mg/ml BNNT aqueous dispersion with PVA from FIG. 3, after about 11 months (same day as FIGS. 7 and 8) and after shaking by hand for 30 seconds (s). The agglomeration is mostly gone after a mere 30 s of shaking by hand, even after 11 months.

The higher concentration BNNT aqueous dispersion (0.2 mg/ml) was left and re-examined after 33, 76, and 122 days. FIGS. 3, 4, 5, and 6 show the dispersion (left container in each figure) and water (right container in each figure) after 0, 33, 76, and 122 days, respectively. No agglomerates were found in the BNNT aqueous dispersions after 33 or 76 days, with just partial agglomeration (less than 25% of BNNTs) at 122 days. FIGS. 7 and 8 show the dispersion (left container in each figure) and water (right container in each figure) after about 11 months, showing BNNT agglomeration settled down leaving a mostly clear supernatant. FIG. 9 shows the homogenous dispersion was restored after 30 seconds of shaking by hand (after 11 months).

EXAMPLE 3

Figure 10:
FIG. 10 shows an image of 100 milliliters (ml) of a 0.2 mg/ml BNNT aqueous dispersion prepared by a tip sonication process, according to an embodiment of the subject invention. This indicates that the process can be easily scaled up from the laboratory to industry scale.

A larger batch of the higher concentration BNNT aqueous dispersion (0.2 mg/ml) from Example 2 was prepared. FIG. 10 shows an image of 100 ml of the dispersion, demonstrating that the process can be easily scaled up from laboratory scale to industry scale.

EXAMPLE 4

FTIR, XPS, and other analysis were performed on the BNNT aqueous dispersions from Example 1 and Example 2.

Figure 11:
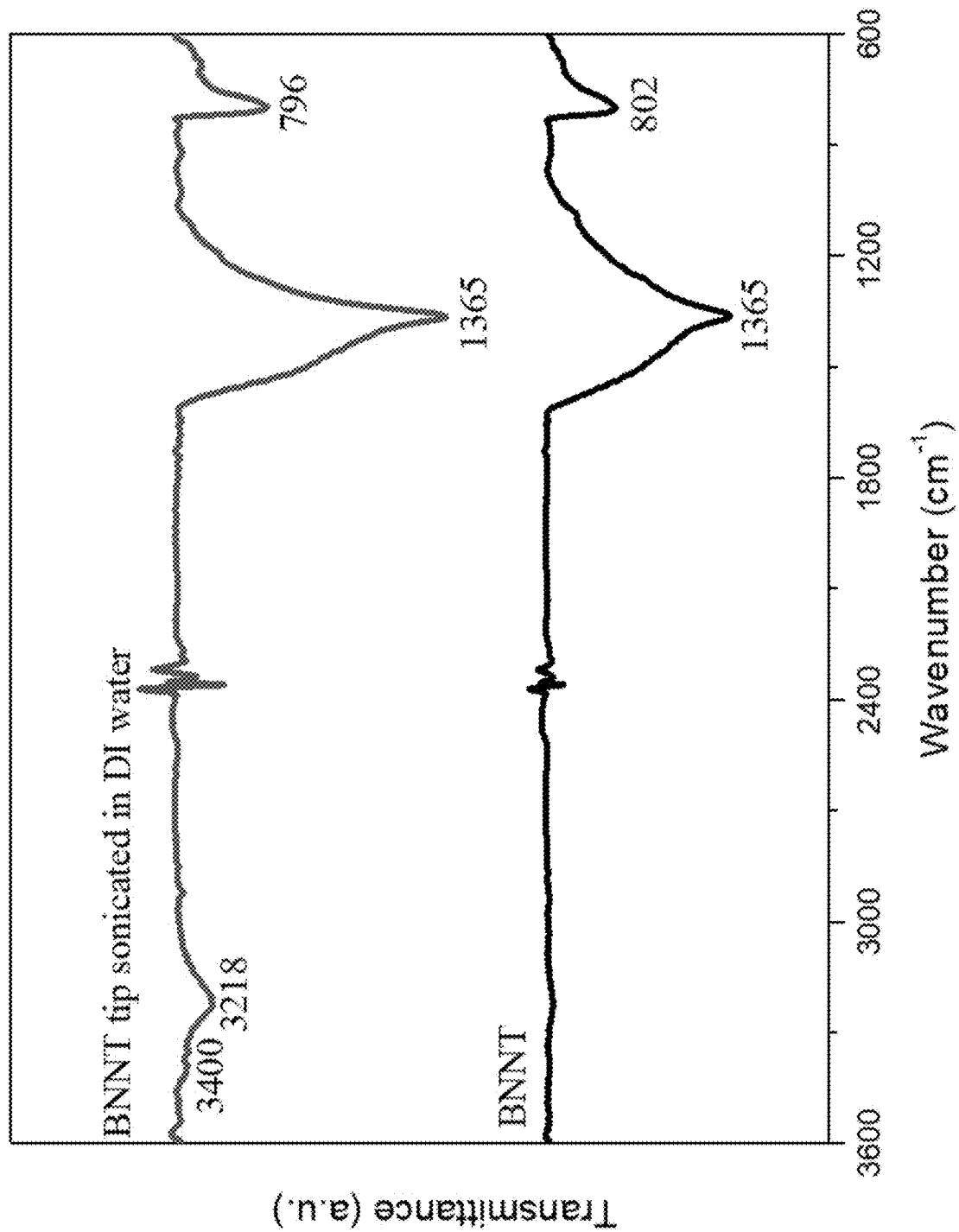
FIG. 11 shows a plot of Fourier-transform infrared spectroscopy (FTIR) results of BNNTs and freeze drying BNNT aqueous dispersions without PVA. The upper curve is for BNNTs tip sonicated in deionized (DI) water; and the lower curve is for BNNTs. The emergence of stronger vibrations at 3400 cm$^{-1}$ assigned to single O—H stretching and 3218 cm$^{-1}$ assigned to concerted O—H stretching confirm that BNNTs have been functionalized with (—OH) hydroxyl groups.
Figures 12A, 12B, 12C:
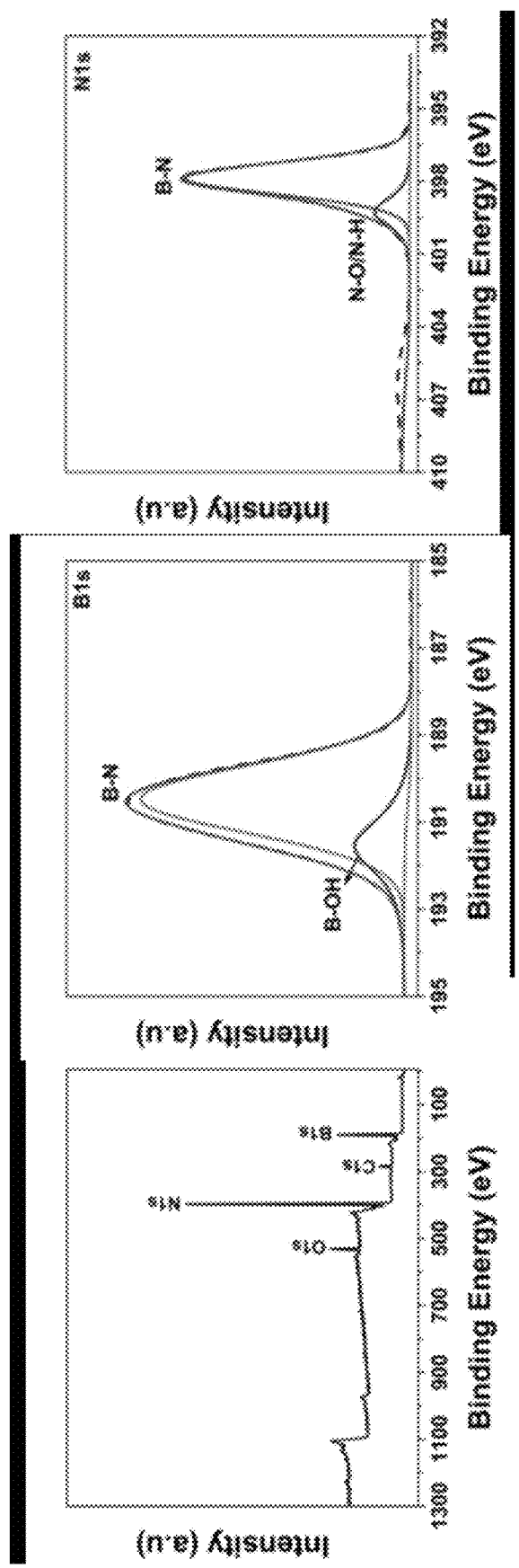
FIGS. 12A-12C show X-ray photoelectron spectroscopy (XPS) results of freeze drying BNNT aqueous dispersions, which further confirms the existence of hydroxyl groups.

FIG. 11 shows a plot of FTIR results of the BNNTs and freeze drying BNNT aqueous dispersions without PVA. The emergence of stronger vibrations at 3400 $cm^{-1}$ assigned to single O—H stretching and 3218 $cm^{-1}$ assigned to concerted O—H stretching confirm that BNNTs have been functionalized with (—OH) hydroxyl groups. FIGS. 12A-12C show XPS results of freeze drying BNNT aqueous dispersions, which further confirms the existence of hydroxyl groups.

Figure 13:
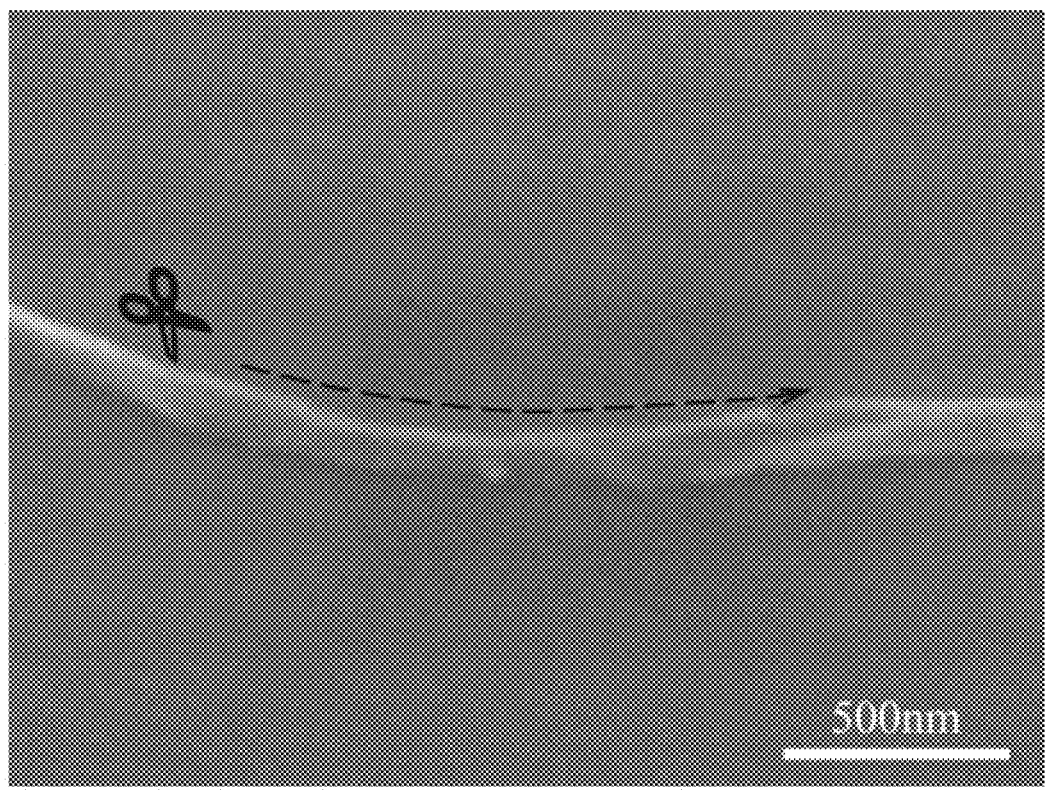
FIG. 13 shows a scanning electron microscope (SEM) image of partially unzipping of a BNNT, owing to the tip sonication functional process. The scale bar is 500 nanometers (nm).
Figure 14:
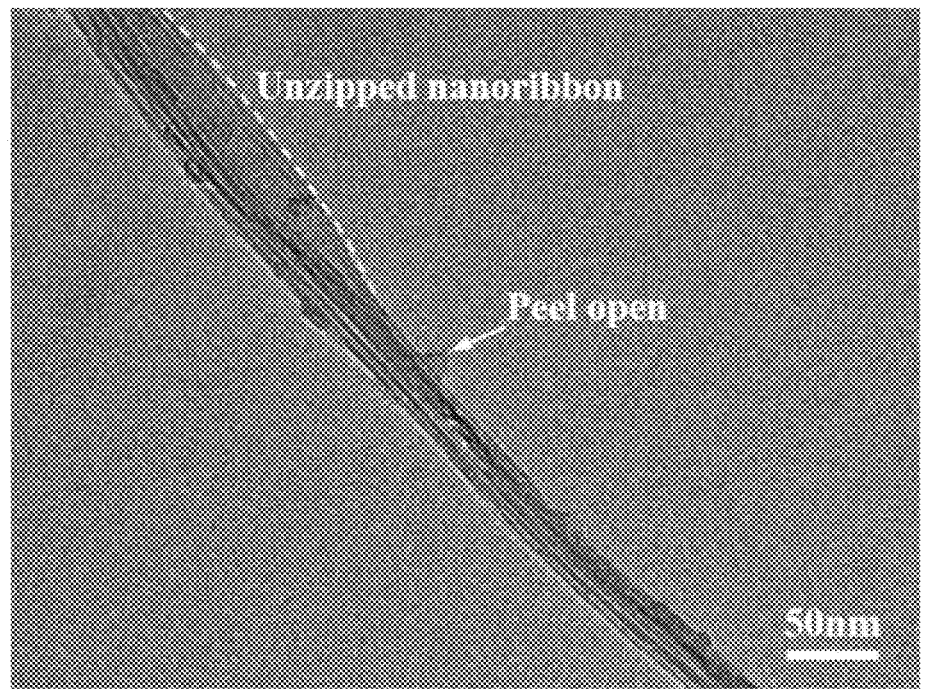
FIG. 14 shows a tunneling electron microscope (TEM) image showing that a BNNT can be partially peeled open and unzipped from the outside wall of the parent multi-walled (MW) nanotube to form a nanoribbon. The scale bar is 50 nm.

FIG. 13 shows an SEM image of partially unzipping of a BNNT, owing to the tip sonication functional process. FIG. 14 shows a TEM image showing that a BNNT can be partially peeled open and unzipped from the outside wall of the parent MW nanotube to form a nanoribbon.

FIG. 15 indicates that the high input energy from the tip probe during the tip sonication process could act as a "scissor" to break the boron-nitrogen bonds and introduce the defect sites, which can lead to the occurrence of hydrolysis. The hydroxyl groups on BNNT owing to the tip sonication process and the addition of PVA as a surfactant dissolved in water can contribute to preparing a high concentration of stable BNNT aqueous dispersions.

EXAMPLE 5

Figure 16:
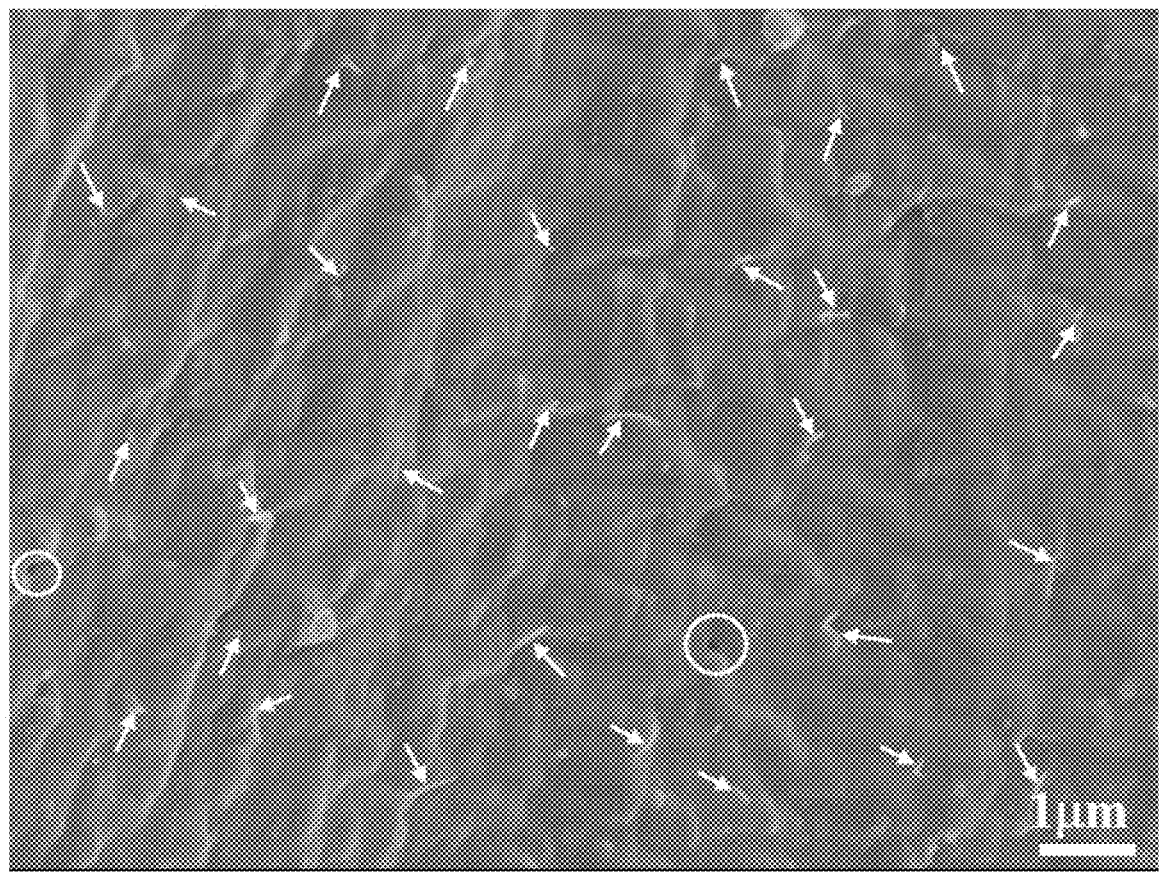
FIG. 16 shows an SEM image of 1 wt. % BNNT in a PVA matrix within a BNNT aqueous dispersion. The fracture surface shows homogenously distributed BNNTs in a PVA matrix, which also demonstrates good dispersibility of BNNT aqueous dispersions. The scale bar is 1 micrometer (μm).
Figures 17, 18:
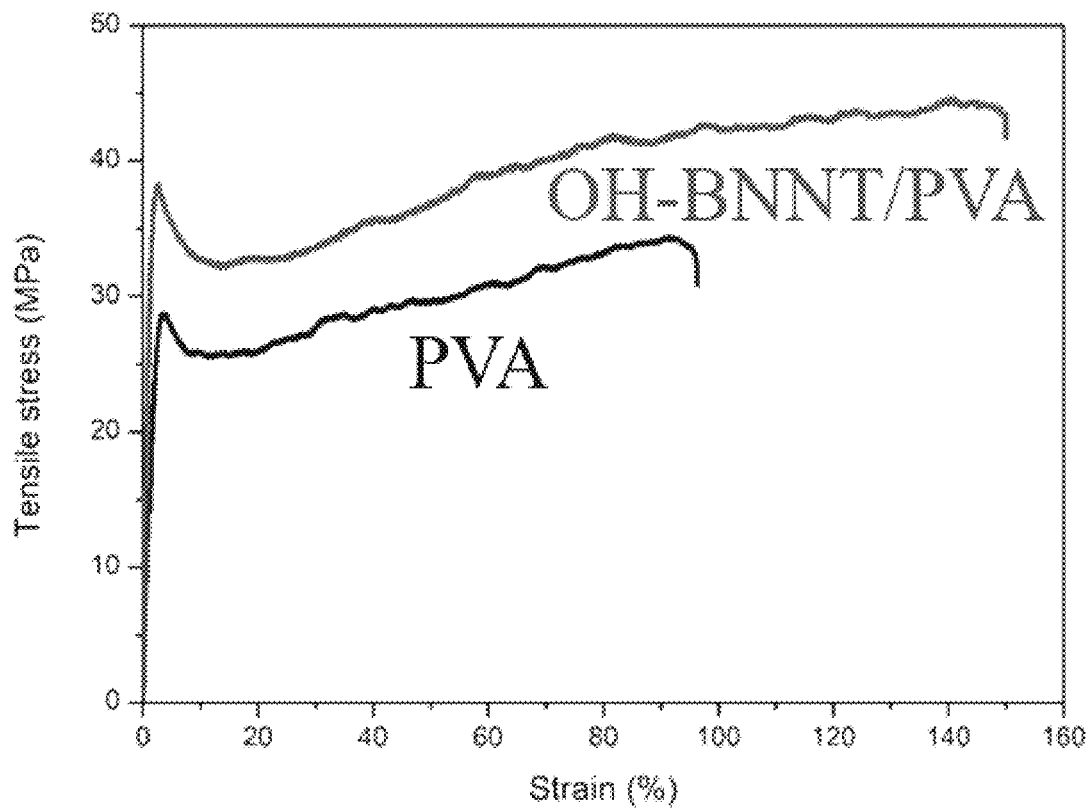
FIG. 17 shows a plot of tensile stress (in megaPascals (MPa)) versus strain (in %) showing that homogenously dispersed 1 wt. % BNNTs in a PVA matrix can simultaneously improve strength and ductile properties. The upper curve is for OH-BNNT/PVA; and the lower curve is for pure PVA.
FIG. 18 shows a table of thermal conductivity (in Watts per meter per Kelvin (W/m-K)), thermal diffusivity (in square millimeters per second (mm$^2$/s)), and specific heat (in joules per gram per Kelvin (J/g-K)) for pure PVA and OH-BNNT/PVA. The addition of homogeneously dispersed 1 wt. % BNNTs can improve the thermal conductivity and thermal diffusivity of PVA by 25% and 29%, respectively. The slightly reduced specific heat capacity of BNNT/PVA is due to the lower value of BNNT (1.431 J/g-K).

A 1 wt. % BNNT in a PVA matrix within a BNNT aqueous dispersion was prepared and analyzed. FIG. 16 shows the 1 wt. % BNNT/PVA. The fracture surface shows homogenously distributed BNNTs in a PVA matrix, which also demonstrates good dispersibility of BNNT aqueous dispersions. Referring to FIG. 17, homogeneously dispersed 1 wt. % BNNTs in a PVA matrix can simultaneously improve strength and ductile properties. Referring to FIG. 18, the addition of homogeneously dispersed 1 wt. % BNNTs can improve the thermal conductivity and thermal diffusivity of PVA by 25% and 29%, respectively. The slightly reduced specific heat capacity of BNNT/PVA is due to the lower value of BNNT (1.431 J/g-K).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of preparing a boron nitride nanotube (BNNT) dispersion, the method comprising:
   providing BNNTs to a container comprising a solvent;
   dissolving a surfactant in the solvent, the surfactant being polyvinyl alcohol (PVA); and
   performing a tip sonication process on the container with the solvent, the surfactant, and the BNNTs to disperse the BNNTs in the solvent, thereby preparing the BNNT dispersion,
   a ratio of the surfactant to the BNNTs in the BNNT dispersion being 1:1.

2. The method according to claim 1, the solvent being a non-organic solvent.

3. The method according to claim 1, the solvent being water.

4. The method according to claim 3, the solvent being deionized water.

5. The method according to claim 4, the BNNT dispersion having 100% stability for at least 75 days.

6. The method according to claim 1, the BNNT dispersion being such that, if agglomeration of BNNTs occurs in the container, the agglomeration can be dispersed by shaking the container with the BNNT dispersion by hand.

7. The method according to claim 1, the BNNT dispersion having 100% stability for at least 40 days.

8. The method according to claim 1, the BNNT dispersion having 100% stability for at least 75 days.

9. A boron nitride nanotube (BNNT) dispersion, comprising BNNTs dispersed in a solvent, the BNNT dispersion having 100% stability for at least 40 days,
   the BNNT dispersion further comprising a surfactant, the surfactant being polyvinyl alcohol (PVA), and
   a ratio of the surfactant to the BNNTs in the BNNT dispersion being 1:1.

10. The BNNT dispersion according to claim 9, the solvent being water.

11. The BNNT dispersion according to claim 9, the BNNT dispersion having 100% stability for at least 75 days.

12. A method of preparing a boron nitride nanotube (BNNT) dispersion, the method comprising:
    providing BNNTs to a container comprising a solvent;
    dissolving a surfactant in the solvent; and
    performing a tip sonication process on the container with the solvent, the surfactant, and the BNNTs to disperse the BNNTs in the solvent, thereby preparing the BNNT dispersion,
    the surfactant being polyvinyl alcohol (PVA),
    the solvent being water,
    the BNNT dispersion having 100% stability for at least 75 days,
    the BNNT dispersion being such that, if agglomeration of BNNTs occurs in the container, the agglomeration can be dispersed by shaking the container with the BNNT dispersion by hand, and
    a ratio of the surfactant to the BNNTs in the BNNT dispersion being 1:1.

* * * * *